United States Patent [19]

Itami et al.

[11] Patent Number: 4,544,574
[45] Date of Patent: Oct. 1, 1985

[54] METHOD OF MANUFACTURING A MAGNETIC RECORDING MEDIUM

[75] Inventors: Teruhiko Itami; Toshifumi Kimoto; Akira Yamasawa; Koichi Saitoh, all of Kanagawa, Japan

[73] Assignee: Fuji Xerox Co., Ltd., Tokyo, Japan

[21] Appl. No.: 556,341

[22] Filed: Nov. 28, 1983

[30] Foreign Application Priority Data

Nov. 29, 1982 [JP] Japan .................. 57-207572

[51] Int. Cl.$^4$ ............................................. H01F 10/02
[52] U.S. Cl. ............................ 427/48; 427/130; 427/131
[58] Field of Search .................. 427/127-132, 427/48

[56] References Cited

U.S. PATENT DOCUMENTS

| | | | |
|---|---|---|---|
| 3,627,580 | 12/1971 | Krall | 117/238 |
| 3,761,311 | 9/1973 | Perrington et al. | 117/239 |
| 4,075,384 | 2/1978 | Suzuki et al. | 428/212 |
| 4,242,400 | 12/1980 | Smith et al. | 427/48 |
| 4,265,931 | 5/1981 | Tamai et al. | 427/48 |

*Primary Examiner*—Bernard D. Pianalto
*Attorney, Agent, or Firm*—Finnegan, Henderson, Farabow, Garrett & Dunner

[57] ABSTRACT

A method for manufacturing a magnetic recording medium wherein a first magnetic layer having a repetitive magnetization pattern is formed on a base layer, an intermediate layer of non-magnetic material is formed over the first magnetic layer, and a second magnetic layer in which magnetic particles are orientated in a predetermined direction is formed on the intermediate layer.

7 Claims, 8 Drawing Figures

4,544,574

METHOD OF MANUFACTURING A MAGNETIC RECORDING MEDIUM

FIELD OF THE INVENTION

This invention relates to a method of manufacturing a magnetic recording medium for a magnetic copying apparatus, and, more particularly, to a method of manufacturing a magnetic recording medium in the form of a laminated structure comprising a base layer and a first magnetic layer having a uniform magnetization pattern and a second magnetic layer which is thermally magnetizable

BACKGROUND OF THE INVENTION

In a magnetic recording method utilizing residual magnetic effect, a permanent image (or a hard copy) is obtained through the following four steps:

(1) A magnetic latent image is formed on a magnetic member;

(2) The latent image is developed with a magnetic toner or coloring particles affected by a magnetic field, the magnetic toner or coloring particles being prepared by mixing magnetic particles in a high molecular resin;

(3) The developed image is transferred onto a recording sheet or the like according to an electrostatic method or a magnetic method; and (4) The transferred image is fixed with heat or pressure into a permanent image (hard copy).

In the above-described magnetic recording method, after removal of the magnetic toner, the magnetic recording medium bearing the magnetic latent image is supplied to the next developing operation, or the magnetic latent image is erased to form a new magnetic latent image, so that the same process may be carried out again.

With respect to this magnetic recording method, there have been proposed a variety of methods of forming magnetic latent images. Among these conventional methods is a so-called "thermomagnetic recording method" in which thermal inputs are utilized to form magnetic latent images. In this method, an inexpensive heating array can be used as the latent image forming means.

With respect to a latent image forming method in the above-described thermomagnetic recording method and a thermomagnetic recording medium used therein, Japanese patent application No. 37865/1981 describes an invention which makes an external bias magnetic field unnecessary, and produces an image of excellent quality by developing a latent image with powder.

OBJECTS AND SUMMARY OF THE INVENTION

In view of the above-summarized background, it is an object of the present invention to produce a magnetic recording medium through a simple and economical process.

A further object of the present invention is a method of manufacturing a magnetic recording medium which enhances the quality of images developed by the thermo-magnetic recording method.

Still another object of the present invention is a method of manufacturing a magnetic recording medium having a first magnetic layer with residual magnetism greater than a second magnetic layer.

Yet another object of the present invention is a method for manufacturing a magnetic recording medium including a magnetic layer with an enhanced coercive force.

These and other objects are accomplished by a method of manufacturing a magnetic recording medium comprising the steps of forming a first magnetic layer on a non-magnetic base layer, forming a second magnetic layer over said first magnetic layer, forming a periodically repetitive magnetization pattern in said first magnetic layer, and magnetizing said second magnetic layer in a predetermined direction.

BRIEF DESCRIPTION OF THE DRAWINGS

These and other objects, features, and advantages of the invention, as well as the invention itself, will become more apparent to those skilled in the art when considered in the light of the accompanying drawings wherein.

DETAILED DESCRIPTION OF THE PREFERRED EMBODIMENT

Before the preferred embodiment of the invention is described in detail, the thermomagnetic recording method will be described. In this regard FIG. 1 is an explanatory diagram of the structure of a recording medium employed in thermomagnetic recording.

Figure 1A:
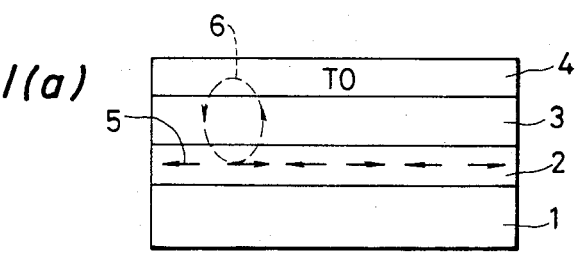
FIGS. 1(a)–1(c) schematically illustrate the thermomagnetic recording method.
Figure 1B:
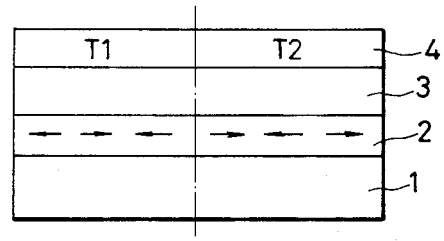
Figure 1C:
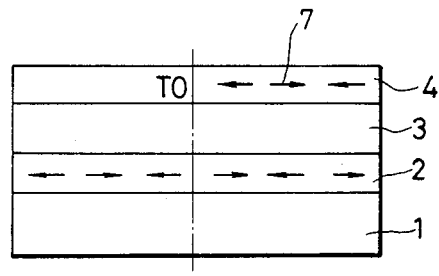

The recording medium, as shown in part (a) of FIG. 1, comprises a non-magnetic base layer 1, a first magnetic layer 2 having a magnetic pattern, a non-magnetic intermediate layer 3, and a second magnetic layer 4. The non-magnetic intermediate layer 3 may be eliminated and replaced by a protective layer (not shown) formed on the surface of the second magnetic layer 4.

Part (a) of FIG. 1 shows a magnetic state of the magnetic recording medium which is provided before a magnetic latent image is formed by inputting a thermal pattern. As is apparent from part (a) of FIG. 1, a repetitive pattern as indicated at 5 is formed over the entire surface.

It can be considered that a magnetic flux 6, induced by the magnetic pattern 5 of the first magnetic layer 2, is distributed in the intermediate layer 3 and the second magnetic layer 4. The magnetic field H of the flux 6 acts on the second magnetic layer 4 and is weaker than the coercive magnetic field Hc (TO)—for instance at a temperature TO when a thermal pattern such as a temperature variation of environmental atmosphere is not applied—of the second magnetic layer 4. Accordingly, in part (a) of FIG. 1, the magnetic state of the magnetic recording medium is such that it has no image data.

The recording medium is subjected to flash exposure, or brought into contact with a thermal head, or illuminated by a laser beam spot, so that a thermal pattern is formed on the second magnetic layer 4. In this connection, it is assumed that a high temperature state is represented by a temperature T2, and a low temperature state by a temperature T1. (However, it should be noted that TO≦T1<T2).

Figure 2A:
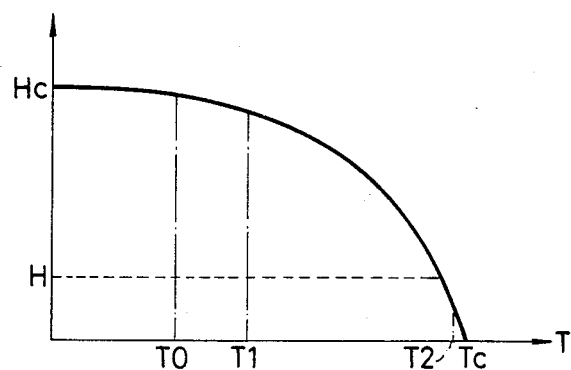
FIG. 2(a) is a graphical representation of the temperature dependence of a coercive field Hc.
Figure 2B:
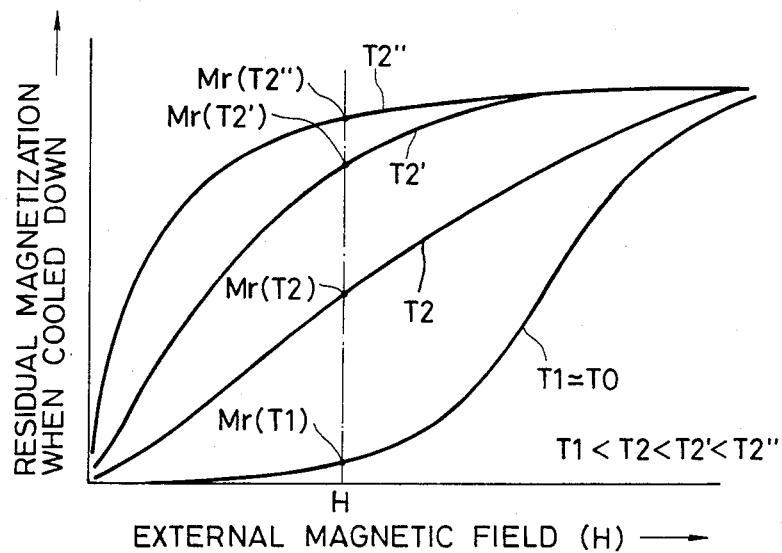
FIG. 2(b) is a graphical representation of the thermal residual magnetization phenomenon.

If the second magnetic layer is made of a material having a coercive field Hc which changes with temperature as indicated typically in part (a) of FIG. 2, then only the high temperature part T2 shows residual magnetization.

Part (a) of FIG. 2 is a graphical representation showing one example of the temperature dependence of a coercive field Hc. This temperature dependence is one of the thermomagnetic effects. In part (a) of FIG. 2, the horizontal axis represents temperature, and the vertical axis coercive fields. The reference character Tc designates the curie temperature.

The thermal residual magnetization phenomenon can be explained clearly with reference to part (b) of FIG. 2. According to the thermal residual magnetization phenomenon, when, under an external magnetic field H (the horizontal axis in part (b) of FIG. 2), a magnetic substance is heated to an initial temperature T2 and is then cooled to room temperature (TO≃T1), it has a thermal residual magnetization of Mr(T2).

Accordingly, the transition from part (b) of FIG. 1 to part (c) of FIG. 1 can be described with reference to part (b) of FIG. 2 as follows. The magnetic field H (as indicated in part (b) of FIG. 2) is produced by the first magnetic layer 2 and acts on the second magnetic layer 4. When a latent image is formed, only the part T2 is heated to high temperature T2' and T2'' and then cooled to a temperature TO. This results in thermal residual magnetization Mr(T2), Mr(T2'), or Mr(T2''). On the other hand, the low temperature part T1 scarcely shows residual magnetization (Mr(T1)).

It can be understood that a magnetic latent image corresponding to the thermal pattern is formed by the above-described operation apparently without application of the external magnetic field.

The second magnetic layer 4 is made of a magnetic material which shows the above-described thermal residual magnetization phenomenon. The magnetic material should be such that the thermal residual magnetization appears in a high temperature range relatively close to room temperature. Most preferable examples of the magnetic material are a distribution coating of a $CrO_2$ magnetic layer whose curie temperature is about 130° C., and a non-crystalline alloy film of a rare earth metal - transition metal (such as Tb-Fe and Gd-Fe). The magnetic latent image which is thermomagnetically formed in the above-described manner is developed by fine powder known as "electrophotographic single-component magnetic toner."

A method of manufacturing a magnetic recording medium used in the above-described thermomagnetic recording method is, for instance as, follows. In order to form the first magnetic layer 2, the non-magnetic base layer 1 is coated with a mixture which is prepared by dispersing and suspending fine particles of Fe, or the like, in high molecular resin or a mixture which is prepared by dispersing and suspending particles of $\gamma$-$Fe_2O_3$ in high molecular resin. Alternatively, a Co-Ni-P alloy film may be formed by plating.

Next, a repetitive magnetic pattern is formed over the entire first magnetic layer 2 by a magnetic head or the like. Thereafter, when necessary, a high molecular resin layer such as a polyimide layer or a polyacrylate layer, is formed as the non-magnetic intermediate layer 3 by coating or the like. Finally, the intermediate layer 3 is coated with a mixture which is prepared by dispersing and suspending $CrO_2$ powder in a high molecular resin in order to form the second magnetic layer 4.

The above-described method, however, suffers from a difficulty in effectively utilizing a magnetic field to orient the $CrO_2$ needle particles in the $CrO_2$ dispersion layer which is formed as the second magnetic layer 4. As a fesult, the rectangular ratio of the magnetization curve (i.e., the coercive force) is not increased. After the non-magnetic intermediate layer 3 is coated with the mixture which is prepared by dispersing and suspending $CrO_2$ particles in the high molecular resin, it should be dried by suitable means under a magnetic field so that the $CrO_2$ needle particles are oriented in a predetermined direction.

In this case, the first magnetic layer 2 in which the magnetic pattern has been formed is affected by the orientating magnetic field. Accordingly, the magnetization pattern is demagnetized or it may be magnetized in one direction (alternately demagnetized) as the case may be. When this occurs, the first magnetic layer 2 cannot be used any longer.

Figure 3:
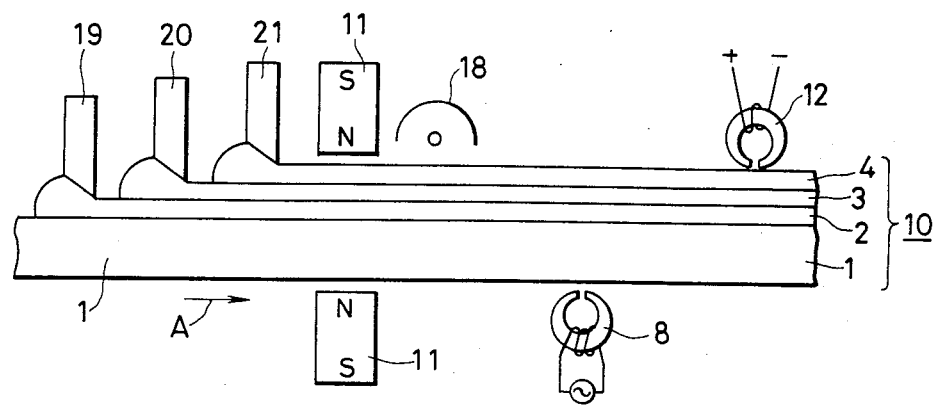
FIG. 3 schematically illustrates an apparatus for practicing the method of manufacturing a magnetic recording medium according to the present invention.

FIG. 3 is a side view outlining the arrangement of an apparatus which is suitable for practicing a magnetic recording medium manufacturing method according to the present invention. In FIG. 3, those components which have been previously described with reference to FIG. 1 are similarly numbered.

The non-magnetic base layer 1 is conveyed in the direction of the arrow A by suitable means (not shown). While the nonmagnetic base layer 1 is being conveyed, a first slurry for forming the first magnetic layer 2 is applied to the layer 1 to a predetermined thickness by a first doctor blade 19.

Next, the intermediate layer 3 is formed on the first magnetic layer 2 by a second doctor blade 20 in the same manner. Finally, a second slurry for forming the second magnetic layer 4 is applied to the intermediate layer 3 to a predetermined thickness by a third doctor blade 21. Thus, a laminated structure 10 having the non-magnetic base layer 1, the first magnetic layer 2, the non-magnetic intermediate layer 3, and the second magnetic layer 4 has been formed.

The layers of the laminated structure may be formed not only by the above-described method but also other conventional methods. For instance, they may be formed according to the methods which have been disclosed by Japanese Patent Application Publication Nos. 2218/1962 and 28681/1973, and Japanese Patent Application Laid-Open Nos. 31602/1972, 111605/1974, 98803/1973, and 21905/1978.

It is not always necessary to form the non-magnetic intermediate layer 3. It may be eliminated as the case may be.

The laminated structure thus formed is passed between a pair of orientating magnetic poles 11, so that the magnetic particles in the first and second magnetic layers are orientated in ohe direction. Thereafter, the structure 10 is dried while being conveyed under a drying unit 18.

The laminated structure 10 is further conveyed in the direction of the arrow A in such a manner that it is in contact with a magnetic head 8. An alternate current (having a frequency of several hundred Hertz (Hz)) is applied to the magnetic head 8 to form in the first magnetic layer 2 a periodically repetitive magnetization pattern.

Figure 4:
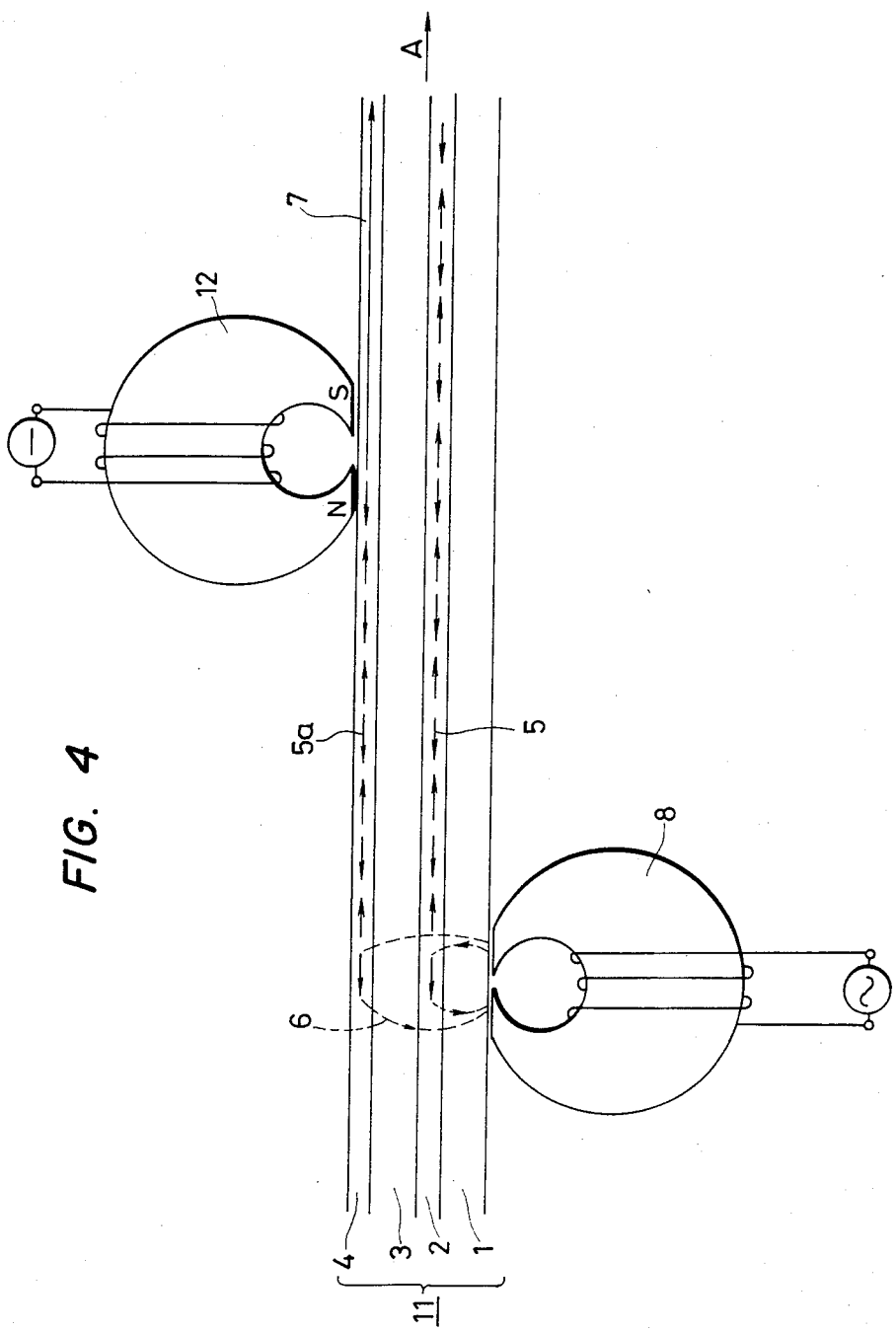
FIG. 4 illustrates a magnetic recording head used in the apparatus of FIG. 3.

The magnetic field of the magnetic head 8 covers the second magnetic layer 4 as shown in FIG. 4. Accordingly, a periodically repetitive magnetization pattern 5a similar to that in the first magnetic layer 2 is formed in the second magnetic layer 4.

When the laminated structure whose second magnetic layer 4 has the repetitive magnetization pattern 5a is used as a magnetic recording medium for a magnetic recording device, a toner image is formed in correspondence to the repetitive magnetization pattern 5a. The toner image thus formed appears as a dirty background for an image which is finally obtained and lowers the contrast of the image. That is, it deteriorates the quality of the resultant image.

In order to eliminate this difficulty, according to the present invention, a second magnetic head 12 is disposed downstream of the first magnetic head 8 in such a manner that it is in contact with the second magnetic layer 4. The second magnetic head 12 generates a magnetic field in one direction so that only the second magnetic layer 4 is magnetized in one direction.

As a result, the periodically repetitive magnetization pattern is erased; that is, apparently the second magnetic layer 4 is demagnetized. The magnetic recording medium which is manufactured as described above can provide a satisfactory magnetic latent image according to the principle which has been described with reference to FIG. 1 as verified by the following experiments.

EXPERIMENT 1

A polyimide film of 12.5 um was used as the non-magnetic base layer 1. A magnetic paint (slurry) was prepared by dispersing and suspending Fe-Co alloy powder in a high molecular resin. The first magnetic layer 2 was formed on the layer 1 by applying the magnetic paint to the layer 1 to a thickness of 5 um.

A polyimide film of 12.5 um was used as the intermediate layer 3. A magnetic paint (slurry) was prepared by dispersing and suspending $CrO_2$ powder in a high molecular resin. The second magnetic layer 4 was formed on the intermediate layer 3 by coating the layer 3 with the magnetic paint to a thickness of 5 um.

A laminated structure was manufactured by forming the above-described four layers according to a conventional method of forming a plurality of layers simultaneously. The laminated structure thus manufactured was passed between a pair of orientating magnetic poles and then dried.

Thereafter, a sinusoidal magnetization pattern having a wavelength of 50 um was formed in the first magnetic layer 2 by the first magnetic head 8 which was positioned to be in contact with the base layer 1 of the structure.

Figure 5:
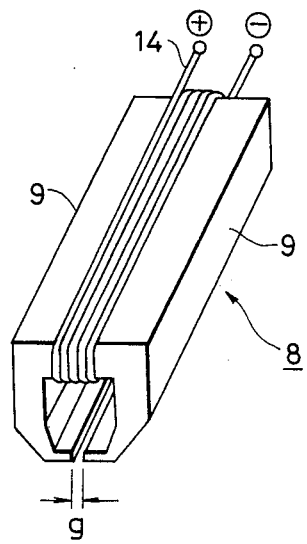
FIG. 5 is a schematic illustration of the magnetic heads used in practicing the method of manufacturing a magnetic recording medium according to the present invention.

The first magnetic head 8 is shown in FIG. 5. An Fe-Si-Al alloy yoke 9 has a track width of 300 mm and a gap g extending over the entire width of the base member 1. A "Formal" copper wire 0.5 mm in diameter was wound on the yoke 9 for five hundred turns.

The surface of the second magnetic layer 4 of the laminated structure type magnetic recording medium which was treated as described above was subjected to toner development. As a result, a toner pattern having a wavelength of 50 um appeared. It was experimentally confirmed that under this condition, the repetitive magnetization pattern was formed in the second magnetic layer 4 also as indicated at 5a in FIG. 4 and a leakage magnetic field is formed over the surface.

EXPERIMENT 2

A laminated structure was manufactured in the same manner as in Experiment 1. Thereafter, a DC magnetic field was generated by a second magnetic head which was in magnetic contact with the second magnetic layer 4, so that the second magnetic layer 4 was magnetized in one direction, i.e., in the direction of conveyance of the laminated structure.

The second magnetic head 12 was similar in construction to the first magnetic head except that in the second magnetic head 12, the gap g was 10 um, a "Formal" copper wire 0.02 mm in diameter was wound on the yoke, and DC current of 10 mA was supplied to the winding.

The surface of the second magnetic layer 4 of the laminated structure type magnetic recording medium which was treated as described above was subjected to toner development. However, no toner stuck to the surface.

A thermal pattern corresponding to an image signal was applied to the magnetic recording medium with a thermal head array held in close contact with the second magnetic layer 4. Thereafter, the thermal pattern was subjected to toner development. The development image was transferred onto a recording sheet and fixed. The resultant image was excellent in quality.

Thus, it has been confirmed through the experiments that the periodically repetitive magnetization pattern formed in the second magnetic layer 4 by the first magnetic head 8 is substantially erased by the unidirectional magnetization of the second magnetic head 12. The periodically repetitive magnetization pattern in the first magnetic layer, however, is not erased by the unidirectional magnetization of the second magnetic head 12.

It goes without saying that in the method of manufacturing a magnetic recording medium according to the present invention, it is preferable that the magnetic force and the residual magnetization of the first magnetic layer 2 be greater than those of the second magnetic layer 4.

As is apparent from the above description, according to the invention, the magnetic recording medium having the laminated structure in which the first magnetic layer contains the periodically repetitive magnetization pattern and the second magnetic layer is magnetized in one direction can be manufactured continuously by a simple apparatus.

While the salient features of the invention have been described with reference to the drawings, it should be understood that preferred embodiments described herein are susceptible of modification and alteration without departing from the spirit and scope of the following claims.

What is claimed is:

1. A method for manufacturing a magnetic recording medium comprising the steps of:
   forming a first magnetic layer on a non-magnetic base member;
   forming a second magnetic layer over said first magnetic layer, wherein the magnetic force and the residual magnetization of said first magnetic layer is greater than said second magnetic layer;
   drying said first and second magnetic layers;

orienting the magnetic particles in said first magnetic layer and said second magnetic layer in a common direction;

forming a repetitive magnetization pattern in said first magnetic layer and said second magnetic layer; and erasing said repetitive magnetization pattern in said second magnetic layer by orienting the magnetic particles in said second magnetic layer in a common direction.

2. A method according to claim 1 further including the step of forming a non-magnetic intermediate layer between said first and second magnetic layers.

3. A method according to claim 1 wherein said step of forming said periodically repetitive magnetization pattern in said first magnetic layer comprises the steps of:

positioning a first magnetic write head beneath said base layer; and applying a periodically varying electrical signal to said first magnetic write head.

4. A method according to claim 1 wherein said magnetizing step comprises the steps of:

positioning a second magnetic write head proximate the upper surface of said second magnetic layer; and applying a constant driving voltage to said second magnetic write head.

5. A method according to claim 2, wherein said step of forming said first magnetic layer comprises the step of applying a slurry of said magnetizable material to the upper surface of said base layer with a doctor blade.

6. A method according to claim 2, wherein said step of forming said intermediate layer comprises the step of applying a slurry of said non-magnetizable material to the upper surface of said first magnetic layer with a doctor blade.

7. A method according to claim 2, wherein said step of forming said second magnetic layer comprises the step of applying a slurry of magnetizable material to the upper surface of said intermediate layer with a doctor blade.

* * * * *